United States Patent [19]

Schröder et al.

[11] 4,013,275
[45] Mar. 22, 1977

[54] APPARATUS FOR DIVIDING AND KNEADING A PIECE OF DOUGH

[76] Inventors: Herbert Schröder; Reinhard Schröder, both of Angerstrasse 5, 8623 Staffelstein, Ofr., Nurnberg, Germany

[22] Filed: Aug. 8, 1975

[21] Appl. No.: 603,123

[30] Foreign Application Priority Data

Aug. 9, 1974 Germany .......................... 2438316

[52] U.S. Cl. .................................. 259/185; 259/2; 259/DIG. 1
[51] Int. Cl.² .......................................... A21C 7/06
[58] Field of Search ................ 259/2, 185, DIG. 1, 259/DIG. 3

[56] References Cited

UNITED STATES PATENTS

| | | | |
|---|---|---|---|
| 3,543,698 | 12/1970 | Grubelnik | 259/185 |
| 3,733,058 | 5/1973 | Konig | 259/185 |
| 3,744,769 | 7/1973 | Kemper | 259/185 |
| 3,785,623 | 1/1974 | Konig | 259/185 |

Primary Examiner—Richard E. Aegerter
Assistant Examiner—Richard R. Stearns

[57] ABSTRACT

The present invention concerns a continuously-operating apparatus for dividing and kneading pieces of dough, comprising a dough-filled container, from which measuring chambers are filled with dough, said measuring chambers being located in a drum which is rotatably mounted in a frame with at least three of the measuring chambers being positioned with their axes in at least one cross-sectional area of the drum; a kneading device which is in angular displacement in the filling-position; a further angularly displaced device which enables the exiting of the kneaded dough; and measuring flasks which are movably arranged in the measuring chambers and are controllable by means of a cam mechanism.

9 Claims, 8 Drawing Figures

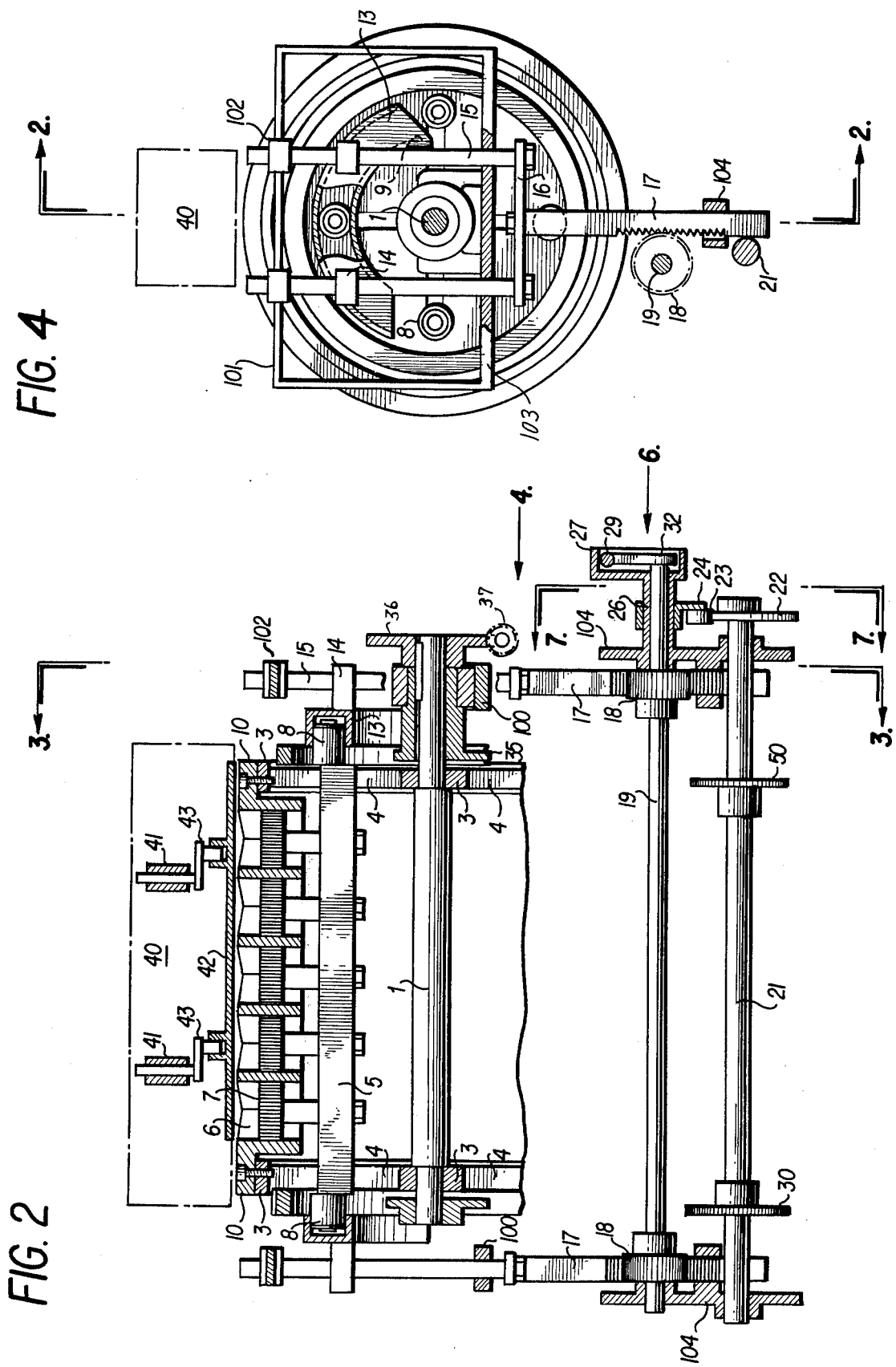

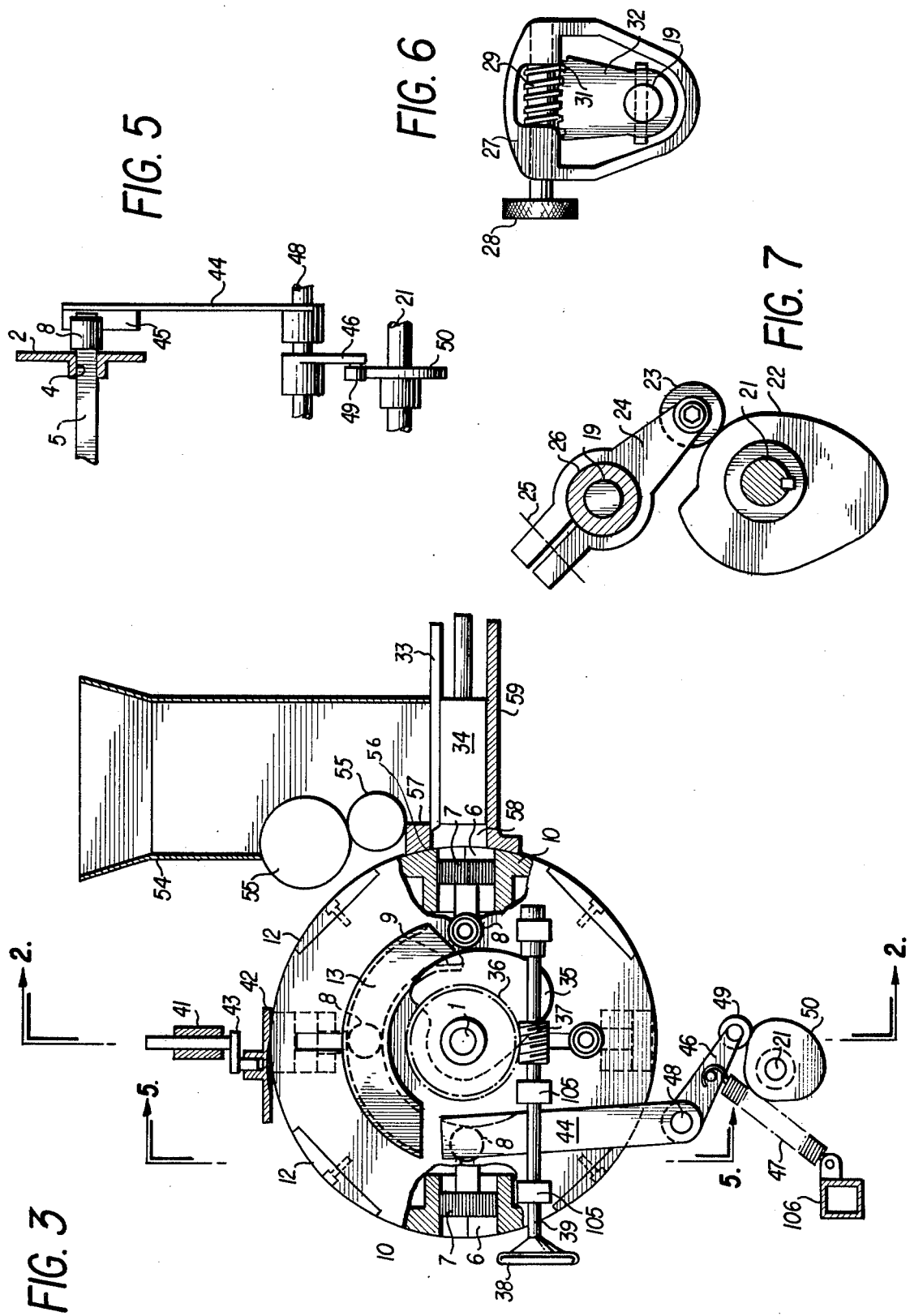

APPARATUS FOR DIVIDING AND KNEADING A PIECE OF DOUGH

FIELD OF THE INVENTION

The present invention relates to mechanical apparatus for automatically dividing a quantity of dough and kneading the dough to be used to mass-produce baked food products.

BACKGROUND, OBJECTS AND SUMMARY OF THE INVENTION

It is the object of the present invention to improve the operation, production and performance of an apparatus for dividing and kneading dough and, in addition, to provide an apparatus having a mode of operation which is more efficient than prior art devices in order to provide the baker with the ability to better control the individually desired amounts of dough and to consider the quality of the dough, especially with regard to the variables of kneading space and the tendency of the kneaded dough to stick. The device of this invention enables the baker to perform the most important adjustments during the operation of the apparatus, so that the baker will be able to observe the ejected dough during the operation of the apparatus and will be able to make any adjustments or improvements he deems necessary on the respective settings of the apparatus. The instant invention is also concerned with producing an apparatus which is simple and inexpensive in that it operates economically, as well as being simple and safe to assemble and to clean as well as being easy to maintain and to operate.

The instant invention provides a cam mechanism which is formed by means of two independently adjustable cam members, namely, by a first cam member which adjusts the first cam section in the control of the filling-device, and by a second cam member which adjusts the second cam section in the control of the kneading device, whereby the two cam sections are formed in such a manner that in each operational setting of the two cam sections a changing of the guide member of the measuring flask from the first-mentioned cam member to the second mentioned cam member is possible. Preferably, the first cam controls the volume and thereby the weight of the individual pieces of dough, while the second cam section guides the measuring flask on the path from the filling position into the ejection position and controls the height of the kneading space in the kneading position. In order to realize this in an advantageous manner, the second cam member which operates in the control of the kneading device activates an oscillating movement automatically independent of the gradual rotation of the drum and the periodic stopping of the same, while the cam member which operates in the control of the filling device is manually movable i.e. forwardly-and-rearwardly, during the operation of the apparatus.

In a preferred embodiment, the cam member which operates in the control of the kneading device is actuated by a continuously-rotating shaft which performs multiple rotations in excess of those of the intermittently rotating drum, whereby the number of rotations of the continuously-rotating shaft corresponds with the number of drum-stops for a full rotation of the drum. It is of a special advantage that the continuously-rotating shaft carries a cam having a form which corresponds with the desired upwards and downwards movements of the cam rail of the kneading space, and thereby with those movements of the measuring flask, and which moves a shaft forwardly and backwardly by means of a cam roller and a cam lever, whereby the shaft lifts and lowers the cam-rail of the kneading space by means of a pinion and gear rack.

For the purpose of adjusting to the individual quantity of dough and the quality of dough, the instant inventive apparatus provides between the cam lever and the shaft, a connection which can be angularly adjusted by hand during operation.

A further improvement is provided by the instant invention in that the cam member which operates in the control of the filling device is fixed on the drum axle and is manually adjustable during operation by means of a worm gear and a screw which are mounted on the drum axle. The two cam members, namely, the cam rail for the control of dough-kneading space and the cam disc for the weight-adjustment, and preferably mutually arranged in a manner that the kneading area cam rail, with its inner inlet area, transverse the effective guiding edge of the cam disc approximately in the area of the filling position, or in the direction of the drum rotation after the filling position, and the guiding edge and inlet area are mutually arranged in such a manner that each roller is able to roll from the guiding edge of the cam disc to the inlet area of the kneading area cam rail. For the further phase of kneading the dough, the invention provides that the kneading area cam rail ends in each setting of height in front of the outlet device, and the guide member of the measuring flask stands in the operational area of an ejection-lever which moves the measuring flask outwardly. Since the activating of the ejection lever is thus effected by means of a cam, the ejection speed may be adapted to the desired conditions by adjusting or replacing the cam with a differently formed cam.

The apparatus shown in FIGS. 1 to 7 brings each measuring flask consecutively into three working positions, namely, a filling position, a kneading position and a removal position, whereby a further holding position is provided between the removal position and the filling position.

The time spent in each of these positions is determined solely by the time which is required in the kneading position for kneading the dough, while only a fraction of the kneading time is utilized for filling in the filling position and for removal of the dough in the removal position; the duration of the kneading position, however, cannot be reduced since initially a certain amount of time is required for loosening the dough from the walls of the measuring chamber as well as from the measuring flask, whereupon the piece of dough is only gradually formed into a ball; the inventive apparatus of one embodiment of this invention recognizes this disadvantage of the prior art machines of this type, independent of whether they have three or more holding positions. In order to avoid this disadvantage, another embodiment of the instant invention provides four holding positions for each measuring chamber, namely, first, for filling with the dough, second for loosening the dough from the walls of the measuring chamber and from the measuring flask, as well as a simultaneous pre-kneading of the dough piece, third, for finishing the kneading and last, for removing the kneaded dough. In this embodiment, for each measuring chamber, there are provided five holding positions, whereby the fifth position is an idling position between the removal position of the kneaded dough and the filling position of the dough.

It may be of an advantage to provide a mutual activating means for the kneaders for the second and third holding positions which preferably serve all measuring chambers located in the two rows of measuring chambers.

BRIEF DESCRIPTION OF THE DRAWINGS

The instant invention is explained in more detail by the drawings, wherein:

FIG. 2 shows a vertical cross-section view through the longitudinal axis of the apparatus, the drum and a stationary frame being shown partially in section for the purpose of a better understanding, this section being taken along lines 2—2 of FIGS. 3 or 4;

FIG. 3 shows the lifting and lowering device for the kneading area cam-rail approximately along line 3—3 of FIG. 2;

FIG. 4 is a partial cross-sectional view approximately according to arrow 4 of FIG. 2;

FIG. 5 illustrates a fragmentary section of the means which serves for ejecting the finished dough viewed from the direction of the arrows 5—5 of FIG. 3;

FIG. 6 illustrates the adjusting device looking from the arrow 6 of FIG. 2;

FIG. 7 shows the gear means for lifting and lowering the kneading space cam-rail according to line 7—7 of FIG. 2.

DETAILED DESCRIPTION OF THE PREFERRED EMBODIMENTS

Figure 1:
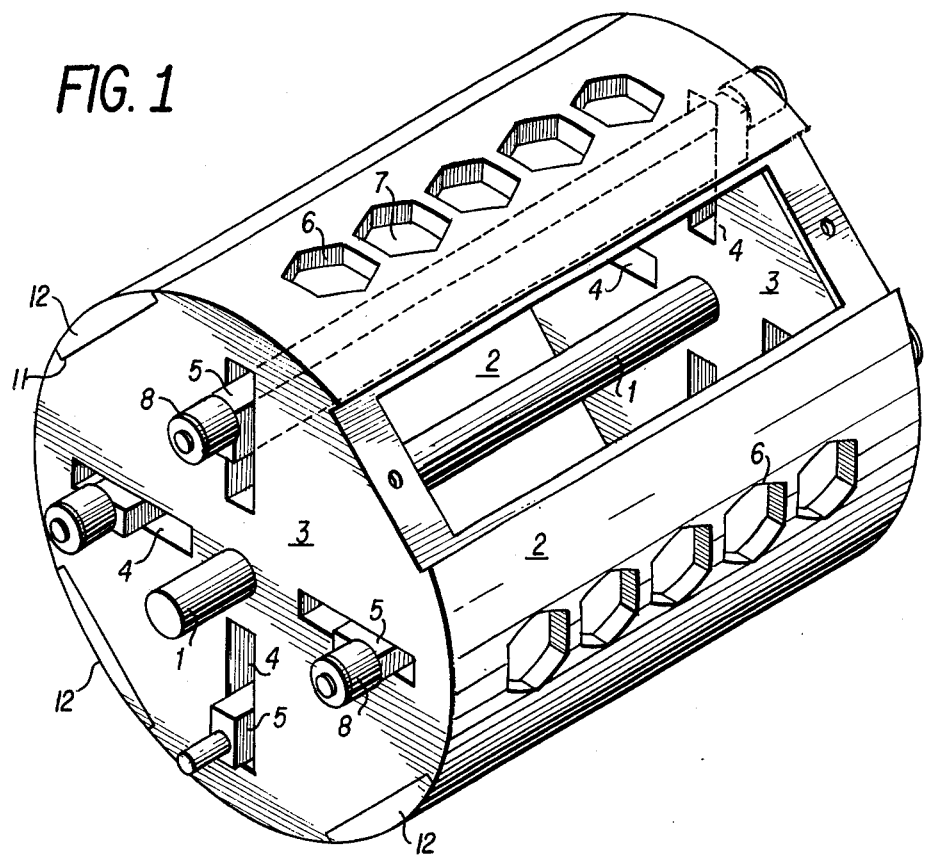
FIG. 1 illustrates the drum which rotates on a stationary drum-axle.

The drum 2 supports itself on a stationary, but angularly-adjustable drum axle 1 by means of its end walls 3 on ball bearings (not shown). Each end wall 3 has four wall slots 4 which are arranged at a 90° angle to each other, and which are parallel to the slots in the opposing front wall. In each two oppositely placed slots 4 of each wall 3 there is displacably arranged a transverse bar 5 running in the direction of the drum axle 1 and displacable away from the same. On the drum circumference are four rows of, recesses or measuring chambers 6 (five in a row) which are arranged parallel to each one of the transverse bars 5 and the respective two slots 4; the measuring chambers serve as receptacles for the dough and open towards the inside of the drum and the outside of the drum.

From FIG. 2, it can be seen that each row of the measuring chambers 6 is not directly provided in the steel- or metaldrum, but if formed in a synthetic insert 10 (not shown in FIG. 1) which extends over the entire length of the drum and preferably is manufactured of a special dough-rejecting material. In addition to the four longitudinal openings in the drum 2 which receive the inserts 10, there are illustrated four further openings 11 in FIG. 1, which are similar to each other, each of which is positioned between two synthetic inserts 10. The openings 11 serve as mounting-, viewing-, and cleaning-openings and are closed by means of lids 12 during the operation of the apparatus.

According to FIG. 2, axle 1 is positioned in the two side-sections 100 of the frame. It does not rotate, but it is pivotal or angularly adjustable. The axle 1 supports the two drum end-walls 3 and within the slots 4 of the same are arranged the transverse bars 5 which are radially movable relative to the axle 1 and the drum wall, (only the straight upper standing transverse bar being illustrated.) Each transverse bar 5 carries, fixedly connected to the same, five measuring flasks 7 (FIG. 2), which are arranged to be slidable in the measuring chambers 6. In order to secure synchronized running of the measuring flasks during uneven stress of the same, each transverse bar 5 is provided with a parallel guiding means (not shown). Furthermore, each transverse bar 5 carries at its ends, which penetrate through the slots 4, transverse bar rollers 8 which are rotatable on pivots, whereby the transverse bar rollers 8 may engage an upward and downward movable kneading space cam-rail 13 (FIGS. 2–4), in which they roll up in the upper section of the rotation during the rotation of the drum 2.

The kneading-space cam-rail 13 is fixedly connected to a pair of vertical rods 15 by means of two welded fishplates 14, the pair of rods 15 being guided in the bottom section 103 (FIG. 4) and in shoulders 102 of a stationary frame 101, the lower end of which is connected to a transverse rod 16. The transverse rod 16 is connected to the top of a vertical toothed rod 17 which is guided in frame section 104. The teeth of rod 17 are engaged by a pinion 18 which rests fixedly on a shaft 19. As shown in FIGS. 2 and 7, the shaft 19 is moved backwardly and forwardly (oscilated) by means of a cam assembly driven by constantly rotating shaft 21. Shaft 21 is positioned in the frame section 104, and due to an activating means (not shown) is continuously rotating and performs a full rotation through 360°, while the drum 2 performs a ¼-rotational movement with one stop between two ¼-rotations. The shaft 21 carries a fixed cam 22 (FIG. 7) on the circumference of which runs a cam roller 23 which is rotatably mounted on a cam-roll lever 24, which is clamped onto a hollow shaft 26 (see also FIG. 2) by means of a nut and bolt 25 whereby said hollow shaft 26 can be rotated on shaft 19. The rotation of the hollow shaft 26 on shaft 19 is normally subjected to interference but is manually adjustable even during the operation. For this purpose, the hollow shaft 26 supports a housing 27 (FIG. 6) in which is located a worm 29, which is rotatable by means of a hand-pinion 28, whereby the worm 29 engages a ring-gear section 31 of an adjusting fishplate 32 which is fixedly connected to shaft 19. The latter is positioned in the frame member 104. This guarantees the cooperation between the ¼-rotation of the drum and the upward and downward movement of the kneading-space cam rail 13. Numeral 30 (FIG. 2) denotes a drive wheel on shaft 21.

A cam disc 35 (FIG. 3) rests on the drum axle 1, onto which is wedged a worm gear 36 which cooperates with a worm 37, whereby said worm 37 rests on an adjustment shaft 39 which is positioned in the frame members 105 and is manually rotatable by means of hand wheel 38. The guiding edge of the cam disc 35 guides, in cooperation with the kneading space cam-rail 13, the position of the measuring flasks 7 from the inlet of the measuring chamber 6 into the filling position and beyond that on the path up to the kneading position. In order to enable a smooth transition of the transverse rollers 8 from the cam disc 35 at each relative position of the cam disc to the kneading-space cam-rail 13, the inlet 9 of the inner cam wall of the kneadingspace cam-rail 13 is angled inwardly and guided further downwardly than the outer cam wall of the rail 13. The cam disc 35 and the kneading-space cam-rail 13, especially its inlet 9, are positioned in the area of the transverse rollers 8 which are guided past the same. The cam disc 35, which during the operation is not rotating, but is only adjustable together with the drum axle 1, is positioned close to the kneading-space cam-rail 13 so that both consecutively affect the transverse rollers 8 (see FIG. 2).

FIG. 3 shows in the filling position at the right, the moment during which a measuring chamber is filled with dough. The conveying piston 34 has pressed the dough onto the outside of the measuring flask 7, which, before the beginning of the pressing process, was flush with the drum-cover surface. In this position, the measuring flask travels through two strokes of the mechanism before reaching the ejection position. The dough has been pressed into the measuring chamber by means of pressure by conveying piston 34, and has pushed ahead of it the measuring flask 7 until the roller 8 positions itself on the guiding edge of the cam disc 35. The cam disc 35, which is adjusted to regulate the load depth of the measuring flask 7 and therewith the desired amount of dough, has first been moved into the respective position by means of hand wheel 38. When the next stroke of the drum rotation starts, the quantity of dough which is located in the measuring chamber 6 is separated from the dough in the outer loading chamber 58 by means of the scraping edge 56 of the scraping rail 57. The roller 8 runs then into the cam path of the kneading-space cam-rail 13.

The respective height position of the kneading space camrail 13 is guided by the shaft 19 via the pinion 18 and toothed rod 17. The shaft 19 is guided on the continuously rotating shaft 21 by means of the cam 22; the shaft 21 rotates counterclockwise (FIG. 7). The line of circumference of the cam 22 is of such form that the kneading space cam-rail 13, shortly before the input of the measuring chamber 6 into the kneading position, is placed in a position in which the measuring flask 7 and the dough resting thereon are pulled back into the measuring chamber 6 to such an extent that during the movement into the kneading position no dough will contact the kneader 42 of the kneading device 40, which kneader is located above the drum. The distance of the kneader 42 from the drum does not need to be changable since the dough to be kneaded is pulled back into the measuring chamber 6 before being moved under the kneader 42 and before the removal from the kneading position. During a further rotation of the cam 22, the measuring flask 7 and the dough resting thereon are forced outwards so that the dough is then brought into contact with the kneader 42 which is activated by means of the eccentrics 43. Immediately after the initial contact between dough and kneader, the measuring flask 7 is lowered by means of the cam 22 so that the dough has sufficient space to take on the shape of a ball. The dough to be kneaded can then be completely kneaded. Afterwards, by means of the next phase of the continuously rotating cam 22, the measuring flask 7 together with the dough resting thereon is pulled further inwards so that the kneaded dough in the kneading chamber arrives undamaged into the ejection position during the next ¼-rotation of the drum 2.

Just ahead of this phase, the transverse roller 8 has exited from the kneading space cam-rail 13 and arrived in the operational area of the ejection lever 44 (see FIG. 5) which is tiltable by means of a forward and backward turnable axle 48 which in a certain angular position to the lever 44 carries an activating lever 46. For the purpose of gripping the transverse roller 8, the upper end of lever 44 is provided with a stop member 45. At the end of the activating lever 46 is located a cam roller 49 which abuts on an ejection cam 50 which is fixedly located on the continuously rotating shaft 21. The circumference of the cam 50 is of such a structure that the ejection lever 44, which is subjected to a counter-clockwise force (in FIG. 3) the return spring 47 is fixed on the frame member 106, engages the transverse roller 8 with its stop member 45, shortly after having moved into the ejection position.

The measuring chamber 6 is filled by means of a fill-container 54 (see FIG. 3), in which are provided two equally-rotating feed rollers 55 which move the dough into the lower part of the fill-container 58, which is located lower than the measuring lever 33 and is also termed the outer chamber. After the filling of the outer chamber 58, the measuring lever or cutter 33 is at first moved forward, thus separating the outer chamber below it from the upper container space. The filling of the measuring chamber 6 is then made by means of the conveying piston 34, which moves the dough in the outer chamber 58 forward until the filling of the space in the measuring chamber 6, which is delimited by the measuring flask 7, is completed. The conveying piston 34 is constructed from an elastic material in such a manner so that the pressure of the conveying piston 34 will not exceed a predetermined maximum limit. The working phase is explained further hereinbelow.

As long as the position of the worm 29 is not altered, the kneading space cam-rail 13 will perform identical upwards and downwards movements, i.e., it must have such a level of height, during the ¼-rotation of the drum 2 in which the measuring flask 7 is pulled back from its filling position, in order to pull back the upper surface of the filled-in dough, so that the movement of the measuring chamber 6 into the kneading position is made without difficulty. The measuring flask 7 is then lifted to the kneading position so that the dough contacts the kneader 42; the measuring flask 7 is then lowered during the kneading so as to provide kneading space for the dough; the measuring flask 7 remains in its position during the kneading up to completion; the measuring flask 7 is further lowered, during or after completion of the kneading, so that the now ball-shaped kneaded dough can be moved without danger into the ejection position during the next hase movement of the drum 2.

The extent and process of the upwards and downwards movements of the kneading-space cam-rail 13 thus depends on the shape of the cam 22.

If the worm 29 (FIG. 6), is adjusted, then only the height position changes, in which the upwards and downwards movements of the kneading space cam-rail 13 are performed; in themselves, these movements remain the same.

The downwardly or upwardly directed movements of the kneading space cam-rail 13 cause a change of its distance from the non-moving cam disc 35. In the illustrated relative position of the kneading-space cam-rail 13 to the cam disc 35, the roller 8 will move into the kneading-space cam-rail 13 during the consecutive ¼-rotation of the drum 2 without a displacement of the flask 7.

If, however, the total phase of movements of the kneadingspace cam-rail 13 is placed higher than shown in the drawings, due to a change in the quality of the dough or for any other reason, by means of activation of the worm 29, then the roller 8 contacts the kneading-space cam-rail 13 during rotation in the operating position after a small angle-turn of the drum 2, namely, it contacts the inlet 9 of the inner cam wall. The roller 8, after contacting the inlet 9, runs along a section of the inlet 9 until it reaches the angular bend point between the inner cam wall and the outer cam wall of rail 13. Thereafter, the roller performs the above-described movements, as predetermined by the cam 22. The operation is now performed in a higher position. Since the dough-quality differs from case to case, the kneading space elevation is adapted to the respective requirements by means of worm 29.

Figure 8:
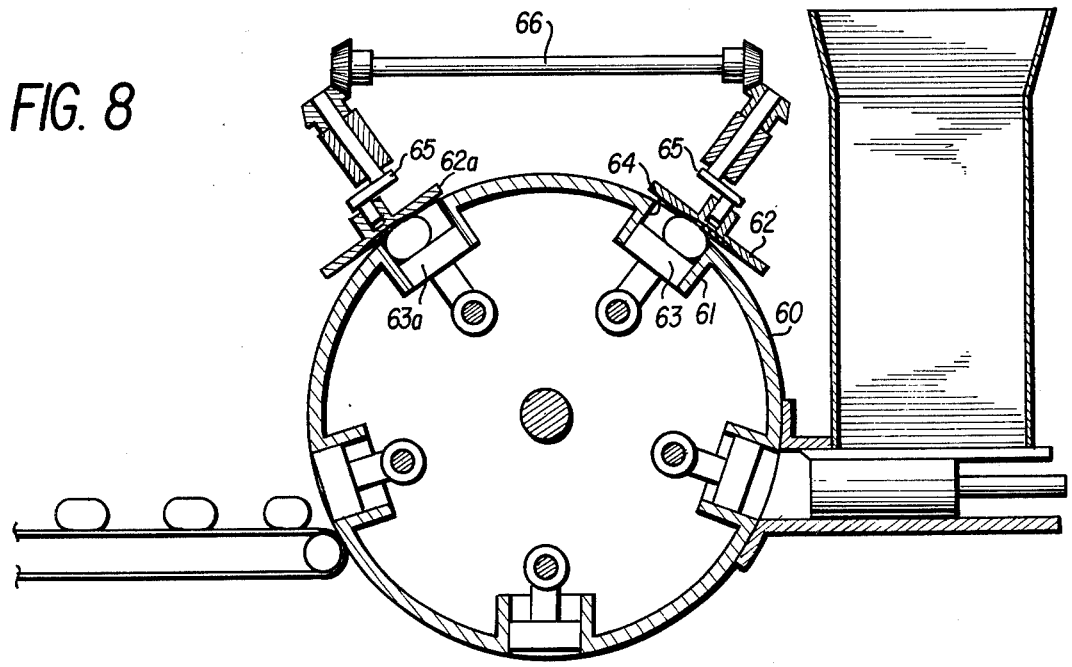
FIG. 8 shows another embodiment of the apparatus illustrated in FIGS. 1 to 7, in which two kneading positions are proposed.

FIG. 8 shows a modified device comprising a drum 60 having five measuring chambers 61 for five holding positions. Each measuring chamber is displaced opposite the two adjacent measuring chambers by 72°. At the bottom right there is provided a filling device which is able to fill just the measuring chamber at the bottom right in the same manner as in the embodiment of FIGS. 1-7. The input device may be differently arranged from the illustrated horizontal position, namely, aligned parallel to the measuring chamber to be filled. The control device for controlling the measuring flasks may be constructed to correspond with the above-described embodiment. However, each drum-rotation consists of five sequences and five holding periods. The eccentrics 65 for activating the kneaders 62, 62a may in a suitable manner or otherwise be activated by means of a mutual gear mechanism 66. At the holding point top right, the dough is loosened first from the measuring flask 63 and the walls 64 of the measuring chamber by means of the kneader 62 at the start of the kneading phase, and a pre-kneading is performed. Before, however, the kneading phase is completed, it is interrupted by pulling the measuring flask 63 backwards and by turning the drum by one step. Thereafter, the measuring flasks 63, 63a are then lifted in the new position to an extent so that each piece of dough contacts the second kneader 62a. The kneading is being completed in the position shown at the left top. The kneaded dough is removed from the position at the left bottom position. The lower position serves as idle-position; when the space below the drum is not required for activating- and control-means, the apparatus can then also be constructed with four measuring chambers being arranged in a circle, the axes of which being at a right angle to each other whereby the axes preferably form an angle of 45° to the horizontal. The removal of the finished, kneaded dough can be accomplished by means of simply permitting the kneaded dough to roll out, since the measuring chambers have a respectively slanted position.

In developing the above idea further, there may be provided three or more kneading positions in which the dough is consecutively kneaded.

The arranging of two or more kneading positions may also be utilized when the enlarging or reducing of the kneading space is obtained either partially or entirely by means of removing and consequently moving the kneaders 62, 62a respectively from or to the drum. This arrangement is even possible in machines in which the measuring flasks perform no adjustingmovements in the measuring chambers or for providing the kneading-space, outside those adjusting movements which are necessary for the individually desired sizes of the kneading dough.

The control of the provision of kneading space may constructively be made also in another manner and by means of a different control device than that shown in the first embodiment (i.e. oscillating kneading space cam-rail 13), and the adjusting of the quantity of dough may constructively be made by other means than those shown in this embodiment (i.e. cam disc 35). Of importance, however, remains the alternate cooperation of the two mutually adjustable cams for one guiding member, whereby the cam performs also an automatically controlled movement for the purpose of providing the kneading space.

The operating mechanisms of the instant invention, namely, the cam mechanisms and the ejecting device, can be mirrored i.e. duplicated, on both ends of the drum.

What is claimed is:

1. In an apparatus for separating and kneading portions of dough including drum means rotatably mounted on a frame for rotating step-by-step in a constant direction of rotation; means connected to said drum means for initiating the step-by-step movement, said drum means including at least three circumferentially-spaced measuring chambers; dough supply means adjacent the outer circumference of said drum means for periodic alignment with the respective measuring chambers; kneading means adjacent the periphery of said drum means for engaging dough in the measuring chambers and kneading the same; an exit portion adjacent the outer periphery of the drum means having associated therewith means for removing the kneaded dough from the drum means, said drum means having an inactive period, between two rotational steps, in which actuating means activate said dough supply means to feed a portion of dough into a first of said measuring chambers, and activate said removing means such that kneaded dough is removed at said exit portion from the third of said measuring chambers; reciprocating measuring-flask means in each of said measuring chambers; and control means for controlling the rotation of the measuringflask means in the position of said dough supply means, the kneading means and said exit portion, the improvement in which, said dough supply means comprises dough conveying means reciprocatably supported for movement toward and away from the outer periphery of the drum, support bars oriented generally parallel to the axis of rotation of said drum means and connected to said measuring flasks and supported on said drum for radial movement toward and away from the outer periphery of the drum for moving said measuring flasks in a corresponding direction, cam disc means rotatably supported on an axis of rotation parallel to said support bars for operatively engaging and radially moving the support bars, means for manually adjusting the position of said cam disc means to adjust the length of the reciprocating movement of the measuring flasks; at least one cam rail engageable with said support bars for retaining them in a path of movement orienting the measuring chambers in an operative position relative to the kneading means; and a second cam device supported for oscillatory movement and engagable with the cam rail for controlling the radial position of the measuring flasks relative to the kneading means, means for positioning said first cam disc and said cam rail such that for each operational position of the cam disc and cam rail wherein a support bar is in a transitional position therebetween, the support bar can have a transitional movement from the cam disc to the cam rail; and ejection lever means, said ejection lever means being operable for sequentially engaging the support bars of the measuring flasks arriving at the exit portion with kneaded dough and urging the dough from the measuring chambers.

2. The apparatus as claimed in claim 1 in which said second cam device includes a continuously rotating shaft carrying a cam having a shape controlling reciprocating movement of the cam rail, support bars and measuring flasks thereon, and a shaft having oscilatory movement through a cam roller engaged with said cam on the continuously rotating shaft, a cam lever connected to said cam roller for moving the cam rail in a reciprocating path, and a pinion and toothed rod operatively connected between said oscilatory shaft and the cam rail.

3. The apparatus as claimed in claim 2 in which said means for manually adjusting the length of the reciprocating movement of the measuring flasks comprises a shaft having reciprocating movement by means of said cam roller, said shaft being hollow and enclosed within a housing and connected to a shaft having a toothed portion engagable with a manually-operable worm gear.

4. The apparatus as claimed in claim 2 in which said drum means includes an axle extending longitudinally thereof and defining the axis of rotation, said cam disc means of said drum means being fixedly connected to said axle, and manually-adjustable worm gear means supporting said axle for orienting the relative position of said cam disc means with respect to said axle.

5. The apparatus as claimed in claim 2 including a control cam fixed to said continuously rotating shaft and rotatable therewith, said cam being operatively connected to said ejection lever means.

6. The apparatus as claimed in claim 1 in which, said support bars including rollers engagable with said cam disc means and movable onto said cam rail.

7. The apparatus as claimed in claim 1 in which cam rails are provided at opposite ends of the drum means and engage opposite ends of said support bars during a cycle of operation of the apparatus.

8. The apparatus as claimed in claim 1 in which said ejection lever means is duplicated at opposite ends of the drum means.

9. The apparatus as claimed in claim 1 in which said drum means measuring chambers are disposed in axially-parallel rows, said drum means including assembling, viewing, and cleaning-openings located between adjacent rows and extending the axial length of the rows, means for closing said assembling, viewing, and cleaning-openings, said last-mentioned means conforming to the cylindrical periphery of said drum means.

* * * * *